US006974006B2

(12) United States Patent
Ruckman et al.

(10) Patent No.: US 6,974,006 B2
(45) Date of Patent: Dec. 13, 2005

(54) ELECTROMAGNETIC ACTIVE VIBRATION CONTROL SYSTEM AND ELECTROMAGNETIC ACTUATOR

(75) Inventors: Christopher E. Ruckman, Alexandria, VA (US); John M. Holford, Oakton, VA (US)

(73) Assignee: VSSL Commercial, Inc., Alexandria, VA (US)

( * ) Notice: Subject to any disclaimer, the term of this patent is extended or adjusted under 35 U.S.C. 154(b) by 51 days.

(21) Appl. No.: 09/754,245

(22) Filed: Jan. 5, 2001

(65) Prior Publication Data

US 2002/0088678 A1 Jul. 11, 2002

(51) Int. Cl.⁷ ................................................ F16F 7/10
(52) U.S. Cl. ..................... 188/379; 267/136; 188/267
(58) Field of Search ............................... 188/379, 380, 188/378, 267, 266.1; 248/550, 636; 340/686; 335/253, 17; 267/136, 140.15

(56) References Cited

U.S. PATENT DOCUMENTS

| 4,848,525 A | * | 7/1989 | Jacot et al. | 188/378 |
| 5,000,415 A | * | 3/1991 | Sandercock | 248/550 |
| 5,032,812 A | * | 7/1991 | Banick et al. | 355/17 |
| 5,209,326 A | * | 5/1993 | Harper | 188/378 |
| 5,257,014 A | * | 10/1993 | Zimmermann | 340/686 |
| 5,303,012 A | * | 4/1994 | Horlacher et al. | 335/253 |
| 5,348,124 A | * | 9/1994 | Harper | 188/378 |
| 5,713,438 A | * | 2/1998 | Rossetti et al. | 188/378 |
| 5,811,821 A | * | 9/1998 | Alexander et al. | 248/550 |
| 5,899,443 A | * | 5/1999 | Su | 188/378 |
| 6,059,274 A | * | 5/2000 | Owen et al. | 267/136 |
| 6,321,781 B1 | * | 11/2001 | Kurth | 137/554 |
| 6,322,060 B1 | * | 11/2001 | Mayama et al. | 267/136 |

* cited by examiner

Primary Examiner—Melanie Torres
(74) Attorney, Agent, or Firm—Dickstein Shapiro Morin & Oshinsky LLP

(57) ABSTRACT

A multi-sensor, multi-actuator control system for controlling vibration in a mechanical structure. The system employs feedforward and feedback control strategies in tandem. Outputs from adaptive feedforward and modal feedback control loops are added to each other. The control system may be dynamically adapted to the changing physical characteristics of the controlled structure. For example, the plant transfer function estimates for the feedforward unit and the gain for the feedback unit may be calculated as functions of sensed physical parameters (location, mass, etc.), and the plant transfer function estimates may be dynamically modified to reflect time-varying feedback control gains. If desired, the control system may be used to cancel low frequency vibrations (<20 Hz) in industrial processes. The actuators may be formed of electromagnets, fixed armatures and interposed flux sensors. In a preferred embodiment of the invention, the robust actuators are sealed so as to be impervious to fluids and dust.

25 Claims, 3 Drawing Sheets

ELECTROMAGNETIC ACTIVE VIBRATION CONTROL SYSTEM AND ELECTROMAGNETIC ACTUATOR

BACKGROUND OF THE INVENTION

1. Field of the Invention

The present invention relates to electromagnetic systems for reducing, eliminating and/or monitoring vibration in variable-state mechanical and/or industrial structures. The invention also relates to an electromagnetic actuator for use in connection with industrial equipment and other apparatuses. The invention also relates to a vibration control system that is dynamically responsive to changing physical and/or environmental characteristics (position, mass, rate of throughput, etc.) of the controlled structure.

2. Discussion of the Related Art

U.S. Pat. No. 5,796,849 (Coleman et al.) refers to a system for actively controlling noise and structural vibration. The Coleman et al. patent relates to situations where the dynamics of the transfer functions between the actuator devices and the residual sensors change over time. In the Coleman et al. system, a probe signal is used to obtain a current estimate of the plant transfer function. U.S. Pat. No. 5,816,122 (Benning et al.) refers to a system for controlling echo-like responses to mechanical disturbances. The Benning et al. system provides for adaptive suppression of vibrations in metal-cutting equipment. In particular, the Benning et al. patent discusses specific techniques, involving boring bars and subtractive shaping of a rotating workpiece, for actively suppressing vibration in a movable machine tool. U.S. Pat. No. 5,713,438 (Rossetti et al.) describes an adaptive feedforward system for controlling vibration of an aircraft fuselage or automobile structure. The Rossetti et al. system does not employ feedback control together with feedforward control, and it does not involve measurement of plant transfer functions. The Rossetti et al. system employs shaker-type electromagnetic elements, which can be difficult and expensive to install and maintain, and which are prone to nonlinear behavior and harmonic distortion. The Coleman et al., Benning et al. and Rossetti et al. patents are discussed in more detail below.

SUMMARY OF THE INVENTION

The disadvantages of the prior art are overcome to a great extent by the present invention. According to one aspect of the invention, a system is provided for controlling vibrations in a variable-state mechanical structure. The system employs multiple sensors and other devices for obtaining vibrational and environmental control data. The system operates one or more electromagnetic actuators in response to the vibrational and environmental control data.

The present invention is well-suited for controlling vibration of a highly resonant, variable-state structure that is sensitive to vibration inputs. According to this aspect of the invention, the resonant characteristics of the controlled structure are not static, but rather, change with the mass, position and/or other changing physical characteristics of the structure. The invention may be used to control structures that are exposed constantly to vibrations from one or more sources, such as pumps, that generate fixed-frequency excitations, and random transient sources as well. To achieve the desired vibration control, the invention employs multiple control strategies in parallel, with dynamic control parameters.

According to one aspect of the invention, a digital controller uses information from the sensor(s) and the actuator(s), along with previously measured characterization data, to compute the actuator force(s) that will minimize vibration at one or more predetermined portions of the controlled structure. The controller computes the desired actuator signal in real time, and transmits it to the corresponding actuator. The actuator injects vibration into the controlled structure at a predetermined location. The injection location may be spaced apart from the region where vibration suppression is desired. This way, the equipment for obtaining vibration control does not interfere with the equipment or material at the location where vibration suppression is desired. The vibration that is injected into the controlled structure by the actuator travels through the structure and cancels the unwanted vibration at the desired location. The unwanted vibration reaches the desired location in the controlled structure starting from another path. With the present invention, a work piece or some other portion of the controlled structure can be brought to rest even though external machinery is still creating incident vibration.

An important aspect of the present invention involves the improved construction of the actuator. In a preferred embodiment of the invention, each actuator is characterized by an armature on one side of a gap and a magnet coil on the other side of the gap. A magnetic force is generated across the gap, and that force is linearized by flux feedback. The relatively uncomplicated actuator of the present invention is more accurate, robust, and efficient (especially at low frequencies) than prior art inertial shakers.

In a preferred embodiment of the invention, the actuator is a coiled electromagnet that is integrally fixed to the predetermined injection location. The armature is fixed to an external structure, such that the armature face is opposed to the electromagnet. The armature may be fixed to the external structure by a mounting plate. The invention should not be limited, however, to the specific structures and instrumentalities described and shown in detail herein. A magnetic flux sensor may be positioned on the face of the electromagnet. The control system uses the flux sensor to compute the necessary input signal to operate the electromagnet. By locating the flux sensor as an integral unit with the electromagnet, all of the signal wires leading to and from the actuator can be integrated together, making the control system more durable, robust and easy to install and maintain in an industrial environment. In an alternative embodiment of the invention, the flux sensor may be physically located outside of the gap between the coil magnet and the armature, provided it is operationally arranged to effectively sense the flux that is between the coil and the armature.

Several features distinguish the actuator of the present invention from other devices that have been suggested for active vibration control. The known systems generally use reaction-mass shakers, pneumatic or hydraulic actuators. Such technologies have moving parts such as bearings, seals and springs that require periodic overhaul. An electromagnet has no moving parts, can easily be made impervious to fluids and dust, and can operate for many years with little or no maintenance. Moreover, electromagnets may be less expensive than other devices. In addition, shakers and other known devices are generally large and bulky so as to achieve useful force levels at low frequencies (generally less than 20 Hertz). The known devices may be prone to nonlinear behavior and harmonic distortion. By contrast, an electromagnet constructed in accordance with the present invention, with appropriate real time control, can generate the necessary forces with a compact and simple actuator that can easily be retrofitted into preexisting machinery spaces. The actuators may be deployed in clusters or distributed groups to generate larger forces if necessary.

The invention may be used to reduce vibration in a payload or workload or other variable-state structure. In addition, the invention may be used to inject controlled vibrations into structural elements for use in certain industrial processes. The invention may also be used, if desired, to monitor and record vibration levels during processing, and to log specific events such as transient vibrations.

The present invention is generally applicable to a variety of mechanical and industrial structures. The controlled structure may be of almost any shape or size. For example, the invention may be used to control vibration in a complex piping system where the source of vibration is external machinery and/or momentum transfer from turbulent flow of material traveling through the pipe. The dynamic properties of the controlled structure may depend on operating conditions such as the density of the material inside the pipe, operating pressure, mass flow rate, etc. The present invention may be responsive to a variety of changing physical conditions, where such changing conditions would otherwise change the vibrational characteristics of the controlled structure.

To control vibration in a fluid flow pipe (or other extended structure), vibration sensors may be attached directly to the pipe, and one or more actuator devices can be attached to the floor or to some other stationary external structure such as a stanchion or bulkhead. The actuators, in concert with the sensors and the controller, apply forces to the pipe structure in a manner that reduces vibration on some predetermined part of the structure (or within the entire structure). If desired, the system can include other sensors as desired to monitor the structure's dynamic properties. Such sensors and other data input devices include, for example, flow meters, tachometers, thermocouples, pressure gages and so forth. All such sensors may be used by the control system to determine actuator signals that reduce vibration at certain critical points on the structure.

In a preferred embodiment of the invention, the digital controller is programmed to employ both feedforward and feedback control strategies in tandem. According to this aspect of the invention, outputs from adaptive feedforward and modal feedback control units are added to each other, and the control system is dynamically adapted to the changing physical characteristics of the controlled structure. For example, the plant transfer function for the feedforward unit and the gain for the feedback unit may be measured or calculated as functions of sensed physical parameters (location, mass, etc.), and the plant transfer function estimates may be dynamically modified to reflect time-varying feedback control gains.

If desired, the control system may be used to cancel low frequency vibrations (<20 Hz) in industrial processes. The actuators may be sealed to be impervious to fluids (oil, water and other chemicals) and dust that may be present in such industrial environments.

According to another aspect of the invention, a vibration control system is formed of electromagnetic actuators for selectively applying forces to a controlled structure, and a digital control system is provided for operating the actuators. In a preferred embodiment, the control system performs calculations based on (1) sensed vibration of the structure, (2) sensed vibration of a feedforward reference (such as vibrations induced by a pump that is external to the controlled structure), and (3) the variable physical state of the controlled structure. If desired, the digital control system may be programmed to perform modal feedback loops, such that the actuators are operated in response to signals from the vibration sensors. If desired, the gains of the modal feedback loops can be controlled as a function of the mechanical or physical state of the controlled structure.

According to yet another aspect of the invention, one or more feedforward sensors may be provided for use in sensing vibration of one or more feedforward references. An example of one such feedforward reference is a pump that operates at an essentially fixed low frequency (e.g., less than 20 Hz). The reference is external to the controlled structure but its vibration is transmitted into the controlled structure. In a preferred embodiment of the invention, the digital control system includes one or more feedforward loops for controlling the electromagnetic actuators in response to signals from the feedforward sensors. In this embodiment, the feedforward sensors are physically separated from the controlled structure.

The present invention may be adapted for use with mechanical or industrial structures whose characteristics and plant transfer functions change while they are under the control of the vibration control system. Some adaptive systems can adjust filter values, etc., to accommodate minor changes without additional information. In other cases, successful adaptation is only possible if the control system has available the new plant transfer function estimates. Performing "system identification" during system operation has the drawback that, in general, the control system must inject energy (the "probe") into the physical system to elicit the plant response, thereby increasing noise levels. The system shown in the Rossetti et al. patent finesses the problem entirely by providing a control strategy that requires no plant estimates at all. This necessarily creates tradeoffs in actuator placement, control techniques (e.g., no feedback), and control performance. The Coleman et al. system ensures that the extra control system energy injected to create a probe signal is at an acceptably low level, with controlled spectral characteristics. This might be useful in keeping some systems relatively quiet. It limits the speed, however, with which plant transfer function changes can be tracked, since one must integrate the responses to weak probes for a long time to achieve reliable estimates.

The present invention exploits that fact that plant transfer functions can change due to both predictable and unpredictable reasons. To illustrate the former, when an extendible beam is lengthened, its change in resonance is, to first order, essentially predictable given a real-time length measurement. If it has been previously characterized and stored as a function of position, no real-time injection of probe energy is needed, and the plant characteristics are known at all times without measurement integration delays. As an example of the latter, one might consider the transfer function from a loudspeaker to a microphone in an aircraft cabin, as passengers move about the cabin. For practical purposes, the effects of passenger motion are unpredictable, and would have to be measured.

Thus, one aspect of the invention involves (1) monitoring the environmental variables that are known a priori to allow for deduction/calculation of plant estimates and (2) identifying the system for all anticipated combinations of those variables prior to entering the "control-on" (or active) regime. In practice, the identification is performed over a discrete, n-dimensional grid, one dimension per variable, and the results are interpolated as needed later. With the complete map of system identifications, one can not only look up transfer functions, but also filter values and control gains that have been pre-computed to work best with a given combination of environmental variables.

In a preferred embodiment of the present invention, it is not necessary to generate a probe signal during the control-on regime (i.e., during the active mode).

These and other features and advantages of the invention will become apparent from the following detailed description of preferred embodiments.

DETAILED DESCRIPTION OF PREFERRED EMBODIMENTS

Figure 1:
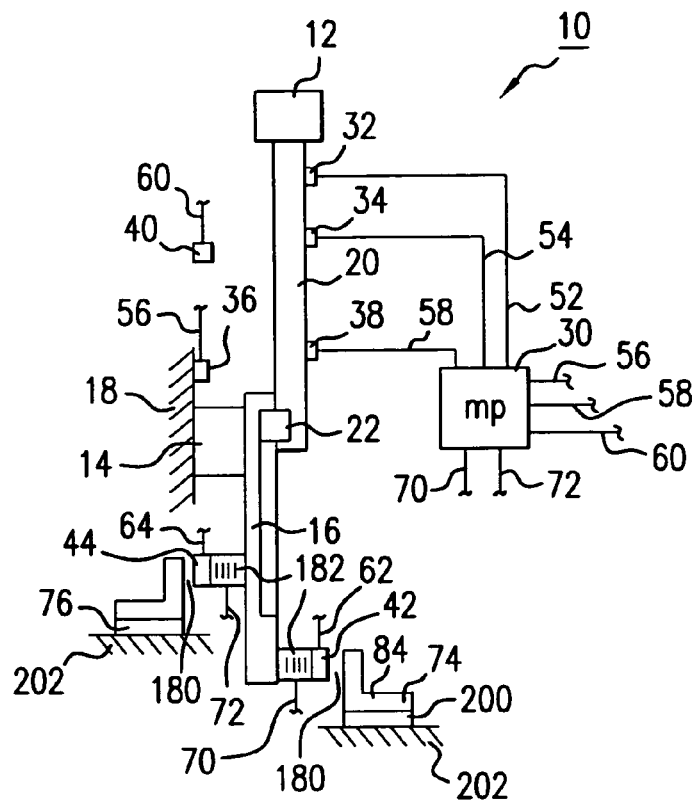
FIG. 1 is a side view of a vibration control system connected to an industrial apparatus, where the control system is constructed in accordance with one embodiment of the present invention.
Figure 2:
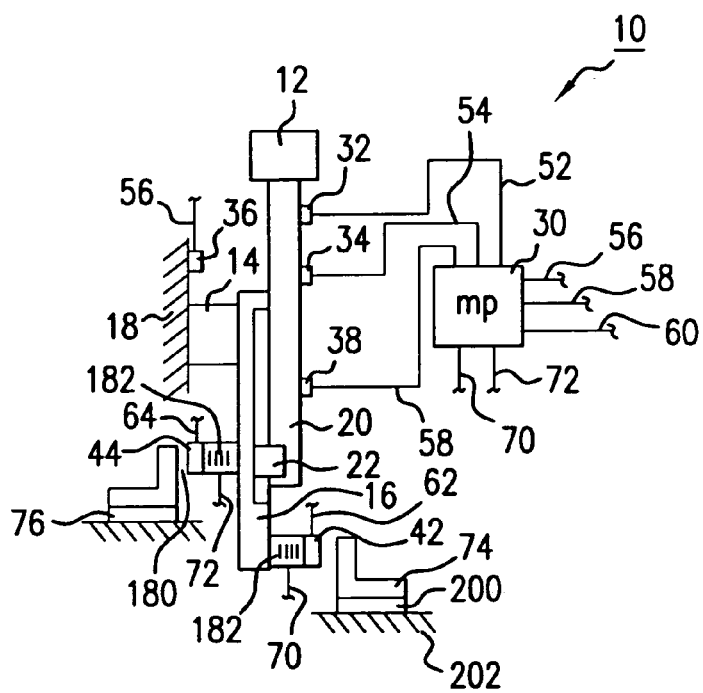
FIG. 2 is a side view of the control system of FIG. 1, with the industrial apparatus in a subsequent process position.

Referring now to the drawings, where like reference numerals designate like elements, there is shown in FIG. 1 an industrial apparatus 10 for supporting a work product 12. The work product 12 may be, for example, payload materials that are being processed by the apparatus 10. The industrial apparatus 10 has a support mechanism 14, 16 that is integrally fixed to a rigid exterior body 18. A slender, extendable beam 20 is connected to and movably supported by the support mechanism 16. A suitable mechanism 22, located on or in the support mechanism 16, causes the beam 20 to move to and fro, such that the work product 12 moves back and forth between first and second positions. The second position for the supported work product 12 is shown in FIG. 2.

In an inactive mode, external rotating machinery (not shown) generates low frequency incident vibration in the exterior body 18. The vibration is transmitted through the support structure 14, 16 and through the extendable beam 20 to the work product 12. In the illustrated arrangement, the work product 12 and the beam 20 form a highly resonant dynamic system that amplifies the incident vibrations, such that the work product 12 tends to vibrate at unacceptable levels. The dynamic (vibrational) properties of the illustrated system 10 depend strongly on mechanical and/or industrial operating conditions such as the mass of the work product 12 and the position of the beam 20 relative to the support structure 14, 16.

In an active (i.e., "control-on") mode, the induced vibration of the work product 12 is damped and/or canceled by a digital control system 30. The control system 30 may include a suitably programmed microprocessor, for example. The control system 30 receives (A) vibrational data from motion and/or acceleration sensors 32, 34, 36, (B) environmental (physical characteristics) data from a position sensor 38 and one or more other input devices 40, and (C) flux data from magnetic flux density sensors 42, 44. The control system 30 processes the input data (received via respective signal lines 52, 54, 56, 58, 60, 62, 64) and generates output signals on lines 70, 72. The output signals (70, 72) are used to operate electromagnetic actuators 74, 76 to apply suitable forces to the support structure 16, to thereby achieve the desired damping and/or cancellation of vibration that would otherwise occur in the work product 12. In other words, the output signals (70, 72) are applied to the actuators 74, 76 to selectively drive the vibration (32) sensed near the work product 12 to a low level.

Figure 3:
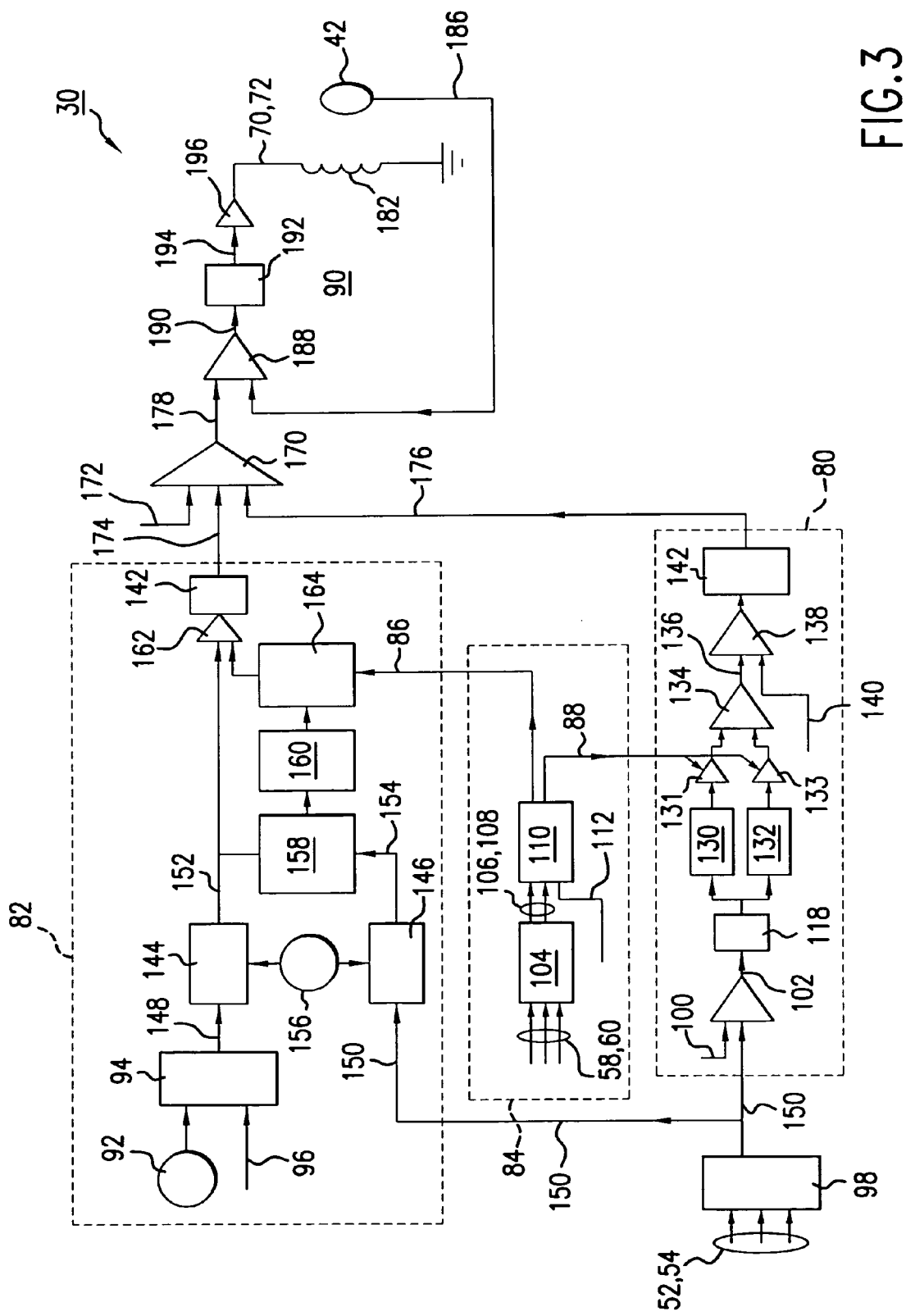
FIG. 3 is a signal flow diagram for the vibration control system of FIGS. 1 and 2.

The operation of the digital controller 30 is illustrated in FIG. 3. In general, resonant modes of the controlled structure 12, 20 are suppressed using feedback controls 80. Tonal vibrations, whether or not at resonant frequencies of the structure 12, 20, are controlled using adaptive feedforward controls 82. Dynamic state and plant estimators 84 track certain dynamic aspects of the system (via signals 58, 60 from the data input devices 38, 40). The tracked dynamic aspects may include a variety of mechanical and industrial parameters, such as the position of the extendable beam 20, the mass of the work product 12 being processed, the ambient temperature of the industrial system 10, the operational throughput production speed of the apparatus 10, etc. In a preferred embodiment of the invention, the dynamic state and plant estimators 84 provide essentially instantaneous plant transfer function estimates 86 as well as optimal control gains 88 for the feedforward and feedback controls 82, 80, respectively. Thus, the combined force demands from the feedforward and feedback controls 82, 80 can be used to drive force control servo loops 90 that inject the proper currents into the electromagnetic actuators 74, 76. There is one force control servo loop 90 for each actuator 74, 76.

For the sake of clarity of illustration, FIGS. 1 and 2 show only two vibration sensors 32, 34, one reference sensor 36, and two electromagnetic actuators 74, 76. In practice, however, the industrial system 10 may have a large number of sensors and actuators. That is, the system 10 may be constructed with N vibration sensors 32, 34, M electromagnetic actuators 74, 76, P modes to control, and Q references (36) for tonal excitations. All of the sensors 32–44 are digitized at S samples per second, and all computations in the control system 30 are updated digitally at the same rate.

Referring now to FIG. 3, in a preferred embodiment of the invention, there are Q numerically controlled oscillators 92—one NCO 92 for each reference sensor 36. A multiplexer 94 is used to track the reference signal (56) with a hardware tachometer 96, the output of the NCO 92, or through other suitable means. The NCO 92 updates its complex phasor output each cycle to generate sine and cosine waves at its operating frequency.

The inputs 52, 54 from the vibration sensors 32, 34 are converted to mode shapes by multiplication by a modal decomposition matrix 98, which may be the identity matrix for systems with largely independent modes that can be sensed at one point. The modal decomposition matrix 98 generates P outputs 150. Each modal estimate 150 is compared to a modal set-point 100 to generate modal error estimates 102. For the illustrated embodiment, where it is desired to obtain essentially complete suppression of vibration in the work product 12, the modal set-point 100 is zero.

Environmental data (58, 60) is obtained from the position sensor 38 and the other data input devices 40. A computational block 104 converts the environmental data (58, 60) into instantaneous plant transfer function estimates 106 and variable control gains 108. The computational block 104 may employ interpolated look-up tables, polynomial curve fitting, or other techniques, to provide smooth updates as the environmental data (58, 60) change over time.

A logic block 110 is used to modify the plant transfer function estimates 106 and the variable control gains 108. Manually entered gain adjustments 112 can be added to the automatically-generated control gains 108 to produce the final feedback control gains 88. The system elements contained within the feedback loop 80 have their transfer functions modified by the feedback gains 88 resulting in the final feedforward plant estimates 86.

To further understand the numerical operation of the control system 30, one may consider a system element having complex transfer function H from force demand to monitored vibration. In the absence of feedback control, the plant transfer function is simply H. If the system element is then controlled by a negative feedback loop with compensator transfer function G, then from the perspective of feedforward, the effective plant transfer function becomes H/(1+GH). If the feedback loop has an additional gain k (e.g., from an operator override), the function is then H/(1+kGH). The control system 30, knowing the complex transfer function H from its system identification and environmental monitoring, and calculating G and k in real-time, can compute H/(1+kGH) in real-time also.

The modal error estimates 102 are passed through fixed filters 118 and adjustable-gain filters 130, 132 to produce stable feedback control loops. In the illustrated embodiment, the adjustable gain filters 130, 132 include two bandpass filters in quadrature, so that arbitrary phase shifts of the error signals 102 can be accomplished by suitable choices for the feedback control gains 88. The control gains 88 are applied to amplifiers 131, 133. Block 134 sums the outputs of the adjustable-gain filters 130, 132, thereby forming the modal force output 136 for each of the P feedback control loops. The output signals 136 are added (138) to a disturbance signal 140. The disturbance signal 140 introduces deliberate modal vibration for system identification. A modal force reconstitution matrix 142 (which may be the identity matrix) allocates the forces required for modal control to the force demands for the electromagnets 182 of the individual actuators 74,76.

Computation blocks 144, 146 convert Q selected references 148 and P modal estimates 150 into respective narrowband complex phasor representations 152, 154. The process used is that of complex heterodyning. For each reference or modal estimate, a digital local oscillator (LO) 156, which may be identical in function to the NCOs 92, defines the center frequency of the filtering process. First the complex conjugate of the LO is multiplied by the modal estimate to create a complex signal that contains both the desired tonal component, near DC ("baseband"), plus an image tone at the sum of the frequencies of the modal input and the LO. A digital lowpass filter then removes the image components, isolating the desired tonal information at baseband. A final complex multiplication by the LO then upconverts the signal to its original frequency, but now as a complex analytic signal. In an alternative embodiment of the invention, a digital Hilbert transform may be employed. Techniques based on complex heterodyning and the Hilbert transform are well known in connection with radar signal processing and communications applications. The techniques are discussed in more detail in Alan V. Oppenheim & Ronald W. Schafer, Digital Signal Processing, 1975, ISBN 0-13-214635-5, section 7.4, the entire disclosure of which is incorporated herein by reference.

Yet another computational block 158 creates Q×P estimates of error with respect to the various references 148. Estimate $E_{ij}$, of the error in $i^{th}$ mode with respect to the $j^{th}$ reference is simply the complex value $E_i/R_j$, where $E_i$ is phasor 154 representing the modal estimate, and $R_j$ is phasor 152 representing the reference. Computational block 160 compensates for references 148 that may be so close in frequency that they correlate over integration periods comparable to the adaptation times. The operation of block 160 is as follows, illustrating a case where references j1 and j2 close in frequency: Error estimate $E_{i-j1}$ is time averaged to form $V_{i1}$ for all i from 1 to P. Error estimate $E_{i-j2}$ is time averaged to form $V_{i2}$ for all i from 1 to P. The ratio $R_{j2}/R_{j1}$ is time averaged to give $B_{12}$. Before use in adaptation, $E_{i-j1}$ is replaced with $E_{i-j1}=V_{i1}-V_{i2}^* B_{12}$. Similarly, $E_{i-j2}$ is replaced with $E_{i-j2}=V_{i2}-V_{i1}^* \text{conjugate}(B_{12})$. In this embodiment of the invention, it is important to use the same type of time average throughout the block.

Complex multipliers 162 apply the optimal complex gains to each reference 148 to create canceling force demands for each mode. Another computational block 164 updates the complex multipliers 162 based on the error signals (158, 160) and instantaneous plant transfer function estimates 86. The modal force reconstitution matrix 142 is then used to allocate feedforward forces among the various actuators 74, 76. The computational block 164 controls the gain of the complex multipliers 162.

A computation block 170 is used to sum the force demands 70, 72 for each actuator electromagnet 182. The inputs to the summation block 170 include the following: a deliberate disturbance term 172, the feedforward component 174 calculated by the feedforward unit 82, and the feedback component 176 calculated by the feedback unit 80. The computation/summation block 170 scales and takes the square root of the total force demand (172+174+176) to compute the magnetic flux density 178 that should be present in the respective electromagnet flux sensor 42 (i.e., in the gap 180 between the actuated electromagnet 182 and the corresponding armature 184) to achieve the desired force on the support mechanism or element 16.

In operation, the flux sensor 42 senses the actual flux 186 in the gap 180. The sensed or achieved flux 186 is subtracted from the desired flux 178 (computation block 188) to obtain a flux error value 190. The error value 190 is passed through a digital compensation filter 192 and re-converted to an analog input 194 to the power amplifier 196 for the electromagnet 182. The analog input 194 may be either a voltage demand or a current demand, depending on the type of compensation filter 192 that is employed. The power amplifier 196 drives the electromagnet 182 to produce the desired flux 178, and hence the appropriate force on the support structure 16.

Figure 4:
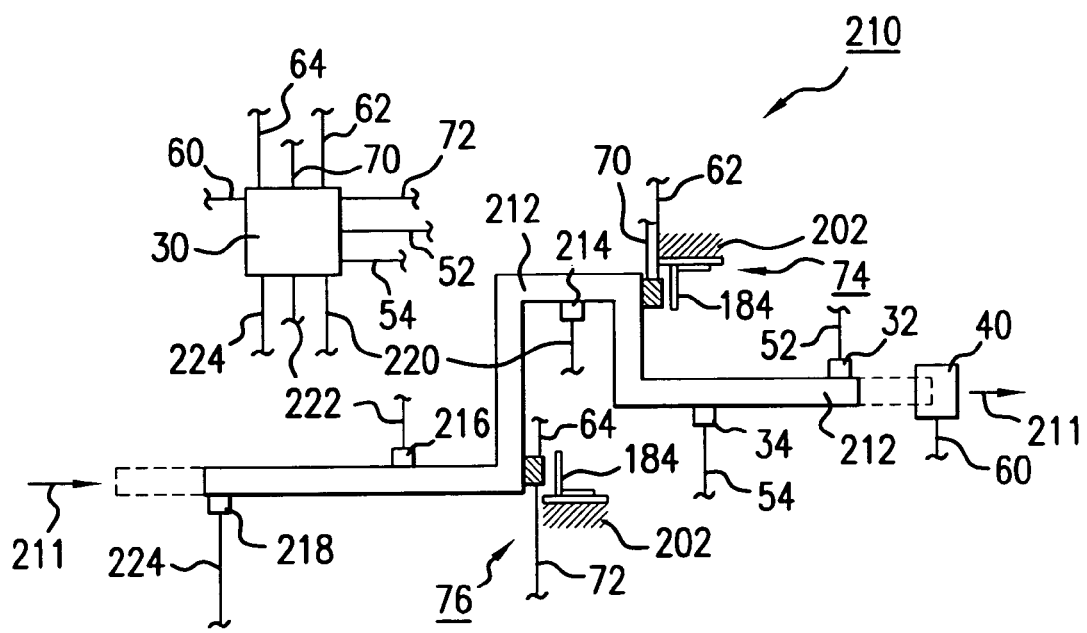
FIG. 4 is a side view of a fluent material handling system constructed in accordance with another embodiment of the present invention.

The present invention may be used to control a wide variety of industrial and other structures, including a complex piping system 210 (FIG. 4), where turbulent fluid 211 flows through an extended pipe 212. The system shown in FIG. 4 has multiple vibration sensors 32, 34, 214, 216, 218 for feeding vibration data to the digital controller 30 via suitable signal lines 52, 54, 220, 222, 224. In addition, the system 210 has an environmental sensor 40 for sensing characteristics of the variable state of the pipe 212. In the illustrated embodiment, the environmental sensor 40 is arranged to sense the mass flow rate of the fluid 211 through the pipe 212. Other environmental data that may be supplied to the controller 30 includes fluid pressure, temperature, etc. The controller 30 receives the input data with respect to vibration of the controlled structure 212, vibration of a feedforward reference (not shown in FIG. 4), and the variable state of the pipe 212, and applies appropriate signals to the electromagnets 182 of multiple actuators 74, 76. Thus, the operation of the control system 30 in the FIG. 4 embodiment is similar to its operation in the FIGS. 1 and 2 embodiment.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

What is claimed as new and desired to be protected by Letters Patent of the United States is:

1. A low-frequency vibration control system, comprising:
   an electromagnetic actuator for selectively applying forces to a controlled structure at a first region of said controlled structure, said forces being adapted to interfere with corresponding forces received at a second region of said controlled structure so that substantial vibration cancellation occurs at a third region of said controlled structure, said actuator consisting essentially of an armature, a magnet coil and a flux sensor; and
   a digital control system for causing a force-linearized flux to be generated in a gap between said armature and said magnetic coil, as a function of sensed vibration, said control system comprising logic for defining a non-linear value of flux demand so as to yield an accurate linear control-demand-to-output-force relationship; and
   wherein said flux sensor sends signals to said digital control system representative of the flux generated in said gap between said armature and said magnetic coil.

2. The vibration control system of claim 1, wherein said magnet coil is integrally fixed to said controlled structure.

3. The vibration control system of claim 2, wherein said flux sensor is connected to said magnet coil.

4. A vibration control system for a variable-state structure, said system comprising:
   electromagnetic actuators for selectively applying forces to said variable-state structure at a first coupling point of said variable-state structure, wherein at least one of said actuators includes an armature, a magnetic coil, a gap located between said armature and said magnetic coil, and a flux sensor located in said gap, and wherein said magnetic coil is arranged to apply an attractive magnetic force to said armature across said gap; and
   a digital control system for producing a force-linearized flux in said gap, and for operating said actuators as a function of sensed vibration of said variable-state structure, said sensed vibration of said variable-state structure being received at a second coupling point of said variable-state structure, sensed vibration of a feedforward reference, and the variable state of said variable-state structure, said digital control system comprising logic for defining a non-linear value of flux demand so as to yield an accurate linear control-demand-to-output-force relationship;
   wherein said sensed vibration of said variable-state structure is substantially canceled.

5. The vibration control system of claim 4, further comprising vibration sensors for sensing the vibration of said variable-state structure.

6. The vibration control system of claim 5, wherein said digital control system includes modal feedback loops for controlling said actuators in response to signals from said vibration sensors.

7. The vibration control system of claim 6, wherein the gains of said modal feedback loops are controlled as a function of the variable state of said variable-state structure.

8. The vibration control system of claim 4, further comprising one or more feedforward sensors for sensing vibration of feedforward references.

9. The vibration control system of claim 8, wherein said digital control system includes one or more feedforward loops for controlling said actuators in response to signals from said feedforward sensors.

10. The vibration control system of claim 9, wherein the plant transfer functions of said feedforward loops are controlled as a function of the variable state of said variable-state structure.

11. The vibration control system of claim 10, further comprising a position sensor for sensing a variable position of said variable-state structure.

12. The vibration control system of claim 10, further comprising a device for inputting data representative of the mass of said variable-state structure.

13. A method of controlling vibration of a variable-state structure, said method comprising the steps of:
    obtaining first data representative of the vibration of said variable-state structure;
    obtaining second data representative of variable mechanical characteristics of said variable-state structure;
    defining a non-linear value of flux demand so as to yield an accurate linear control-demand-to-output-force relationship;
    selectively applying force-linearized magnetic flux to produce electromagnetic forces on said variable-state structure at a first coupling of said variable-state structure as a function of said first data and said second data, wherein said vibration is driven at a second coupling of said variable-state structure; and
    attenuating the vibration of in a region of said variable-state structure.

14. The method of claim 13, further comprising the step of operating a feedforward loop based on a fixed-frequency reference that is external to said variable-state structure.

15. The method of claim 14, further comprising the step of changing the plant transfer function estimates of said feedforward loop as a function of said second data.

16. The method of claim 15, further comprising the step of changing the characteristics of said feedforward loop as a function of said first data.

17. The method of claim 16, further comprising the step of operating modal feedback loops based on said first data.

18. The method of claim 17, further comprising the step of changing the gain of said feedback loops as a function of said first data.

19. A vibration control system, comprising:
    an actuator for applying a force to a variable-state structure at a first coupling location of said variable-state structure, said actuator including an electromagnet, an armature and a magnetic flux density sensor, and wherein said magnetic flux density sensor is operatively located so as to sense the magnetic flux between said electromagnet and said armature;
    a data input device for inputting data representative of the variable state of said variable-state structure including data related to a force received at a second coupling location of said variable-state structure; and
    a processor for applying force-linearized magnetic flux producing signals to said electromagnet for canceling unwanted vibration in a region of said variable-state structure, said processor being operatively connected to said data input device and said magnetic flux density sensor, said processor defining a non-linear value of flux demand so as to yield an accurate linear control-demand-to-output-force relationship.

20. The vibration control system of claim 19, wherein said processor is arranged to calculate the difference between the flux density sensed by the magnetic flux density sensor and the flux density required in the actuator to control vibration of the variable-state structure.

21. The vibration control system of claim 20, wherein said electromagnet is integrally connected to said variable-state structure, and said armature is integrally connected to an external structure.

22. The vibration control system of claim 21, wherein said electromagnet is sealed to prevent degradation by fluids and dust.

23. A vibration control system for a variable-state structure, said system comprising:
    electromagnetic actuators for selectively applying forces to said variable-state structure at a first coupling point of said variable-state structure, said forces being adapted to cancel the effects of corresponding forces received at a second coupling point of said variable-state structure, wherein at least one of said actuators includes an armature, a magnetic coil, a gap located between said armature and said magnetic coil, and a flux sensor located in said gap, and wherein said magnetic coil is arranged to apply an attractive magnetic force to said armature across said gap; and
    a digital control system for operating said actuators as a function of sensed vibration of said variable-state structure, sensed vibration of a feedforward reference, and the variable state of said variable-state structure, said sensed vibration of said variable-state structure being received at the second coupling point of said variable-state structure, said control system comprising logic for defining a non-linear value of flux demand so as to yield an accurate linear control-demand-to-output-force relationship.

24. A vibration control system, comprising:
    an actuator for applying a force to a variable-state structure at a first coupling location of said variable-state structure, said forces being adapted to cancel the effects of corresponding forces received at a second coupling location of said variable-state structure, said actuator including an electromagnet, an armature and a magnetic flux density sensor, and wherein said magnetic flux density sensor is operatively located so as to sense the magnetic flux between said electromagnet and said armature;
    a data input device for inputting data representative of the variable state of said variable-state structure including data related to a force received at the second coupling location of said variable-state structure; and
    a processor for applying signals to said electromagnet, said processor being operatively connected to said data input device and said magnetic flux density sensor, said processor defining a non-linear value of flux demand so as to yield an accurate linear control-demand-to-output-force relationship.

25. A method of controlling vibration in a structure comprising:
    receiving a first mechanical vibration signal from an electromagnetic actuator at a first coupling point of said structure, said electromagnetic actuator including an armature, a magnetic coil, a gap located between said armature and said magnetic coil, and a flux sensor located in said gap;
    receiving a second mechanical vibration signal at a second coupling point of said structure; and
    receiving, at a defined region of said structure, a third mechanical vibration signal, said third mechanical vibration signal including a portion of said second mechanical vibration signal attenuated by a portion of said first mechanical vibration signal.

* * * * *